(12) United States Patent
Iho et al.

(10) Patent No.: US 6,209,050 B1
(45) Date of Patent: Mar. 27, 2001

(54) EXPANSION CARD

(75) Inventors: Jari Iho, Tampere; Jari-Pekka Heikkilä, Lempäälä, both of (FI); Petri Heinonen, Tokyo (JP); Riku Rimpelä, Tampere (FI); Arto Suomi, Tampere (FI); Vesa Savela, Tampere (FI); Jouni Rapakko, Kylmäkoski (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/199,686

(22) Filed: Nov. 25, 1998

(30) Foreign Application Priority Data

Dec. 1, 1997 (FI) .......................................... 974379

(51) Int. Cl.[7] .............................. G06F 3/00; G06F 13/00; G06F 13/42; G06F 9/00
(52) U.S. Cl. ............................... 710/101; 710/11; 710/14; 710/105; 713/1
(58) Field of Search ................................... 710/101, 102, 710/14, 105, 11; 713/1, 2

(56) References Cited

U.S. PATENT DOCUMENTS

| | | | |
|---|---|---|---|
| 5,517,646 | 5/1996 | Piccirillo et al. | 395/700 |
| 5,537,654 | 7/1996 | Bedingfield et al. | 395/834 |
| 5,794,058 | 8/1998 | Resnick | 395/750.05 |
| 5,809,115 | 9/1998 | Inkinen | 379/93.05 |

FOREIGN PATENT DOCUMENTS

| | | |
|---|---|---|
| 0349726 A2 | 1/1990 | (EP) . |
| 0 471 928 A3 | 2/1992 | (EP) . |
| WO 95/34086 | 12/1995 | (WO) . |

OTHER PUBLICATIONS

Finnish Official Action with English translation thereof.

*Primary Examiner*—Xuan M. Thai
(74) *Attorney, Agent, or Firm*—Perman & Green, LLP

(57) ABSTRACT

The invention relates to an expansion (1) arranged to operate in at least a first function mode. The expansion card comprises at least means (4, 6) for setting the function mode and means (2b, 13, 14) for connecting the expansion card to the expansion card connector (2a) of the electronic device. The expansion card (1) comprises further means (4) for generating a signal on turning on of the expansion card (1) and means (2b, 8, 11, 13) for transmitting the signal to an electronic device (3). The expansion card is also provided with means (4) for forming a message about setting the first function mode and means (2b, 8, 11, 13) for transmitting the message to the electronic device.

10 Claims, 4 Drawing Sheets

EXPANSION CARD

Figure 1:
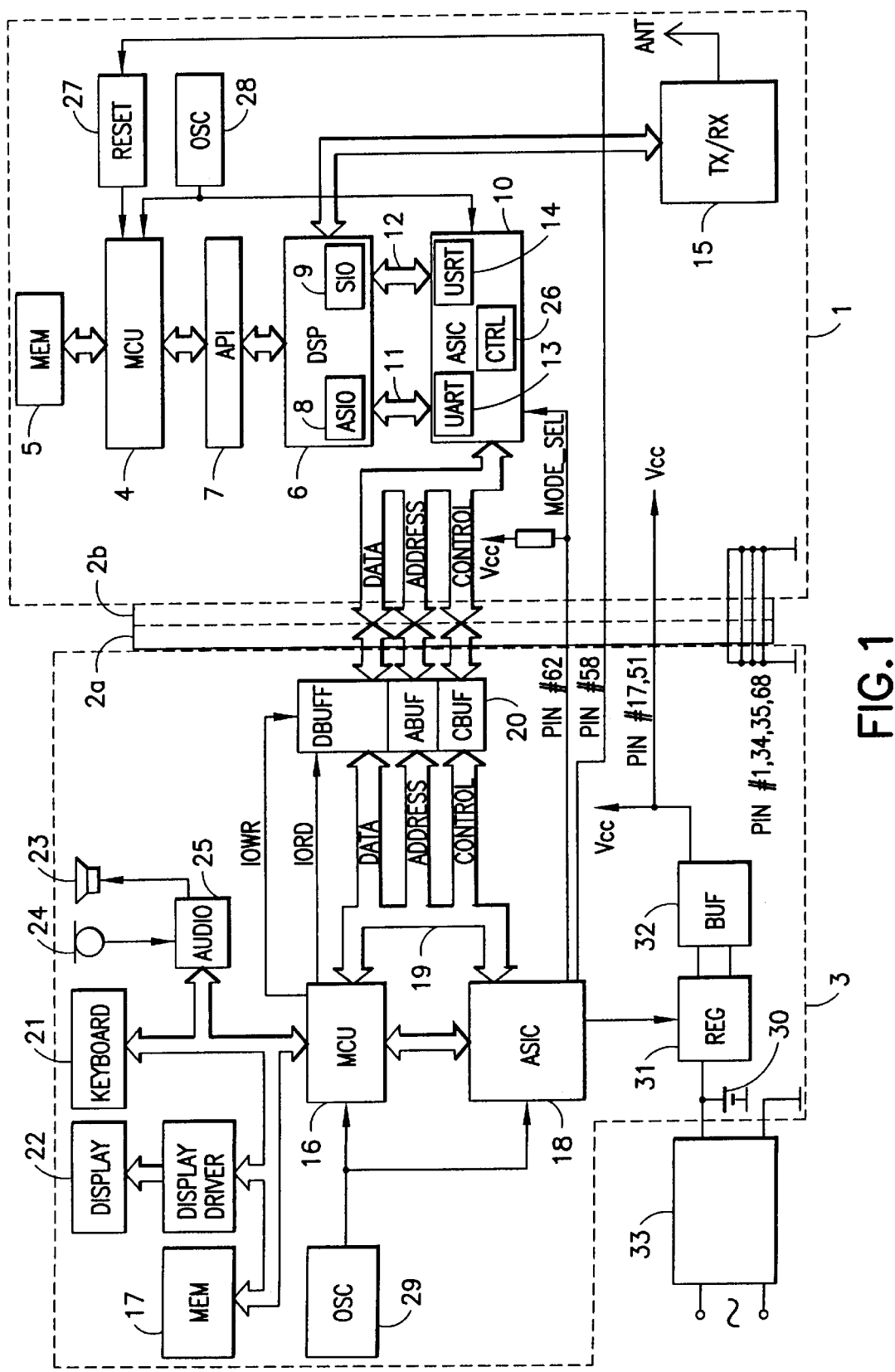

The present invention relates to an expansion card as set forth in the appended claim 1, a method for controlling the expansion card as set forth in the appended claim 5, and a mobile station as set forth in the appended claim 10.

In connection with data processors, modem cards are used for transmitting information via a telecommunication network between data processors which can be even very far from each other. There are internal modems which are formed as modem cards to be inserted in an expansion slot, external modems which can be connected to the data processor e.g. via a serial port, and particularly for portable data processors, modem cards have been developed in card form according to the PCMCIA standard. Irrespective of the type of the modem, the modems can almost without exception be controlled with so-called AT commands. The AT commands are defined e.g. in the standard 07.07 formulated by the European Telecommunications Standards Institute ETSI. By means of these AT commands, the data communications application program can determine various function parameters for the modems, give the telephone number to be selected, etc. The AT commands are used in a way that the data communication application program started in the data processor generates a character string starting with the letters AT followed by the actual command to be carried out. For example, the selection of the telephone number 123456 can be gives as the command ATDT123456, where the letter D indicates that it is a selection for dialling a telephone number and the last letter T indicates that the telephone number is generated on the basis of the voice-frequency method. Another alternative is the selection of a pulse string (ATDP . . . ).

The formed AT command is transmitted from the connection interface of the data communication application program (data communication application interface) advantageously via a so-called device driver to the modem, where the command is received and interpreted. This device driver can control cards or serial ports or the like connected with the data processor. There are different types of device drivers for different use purposes, which is prior art known to an expert in the field and which does not need to be described further in this context.

The purpose of the data communication application interface is e.g. to generate AT commands on the basis of information given by the user, to be transmitted to the modem, and to give the user information coming through the modem, e.g. a message transmitted from another data processor on the display of the user's data processor. Thus, the user does not necessarily need to know anything about these AT commands.

The PCMCIA connection (Personal Computer Memory Card International Association) is a known connection used with electronic devices for connecting expansion cards, such as memory cards (e.g. FLASH memory cards), modems and various input/output cards (I/O) with the electronic device. Thus, the electronic device and the PCMCIA card are provided with connectors complying with the PCMCIA standard so that the connector of the electronic device is a so-called male connector, i.e. it has connector pins, and the card connector is a so-called female connector, i.e. it has conductor sockets, wherein when the PCMCIA card is connected with the PCMCIA connector of the electronic device, an electric coupling is formed between each connector pin and the corresponding conductor socket. The PCMCIA standard defines the usual functions for each connector pin and corresponding conductor socket. Consequently, for example in an application where the PCMCIA connection is implemented in a computer, each data line in the data bus of the computer is connected to one connector pin in the PCMCIA connector. Further, at least some of the address and control lines are conducted to the connector.

The PCMCIA cards have the size of a credit card (85.6 mm×54 mm), but the thickness of the cards may be 3.3 mm (type I), 5.0 mm (type II) or 10.5 mm (type III). Electrically, the PCMCIA cards are connected with the electronic device in an 8/16 bit I/O connection or memory. The card complying with the PCMCIA standard has a memory space which is readable to the electronic device and contains information for identifying the card, an information structure data file (card information structure, CIS).

Particularly in connection with portable data processors (Laptop PC), mobile station applications have been developed in which at least the transmitter/receiver unit of the mobile station is arranged in the PCMCIA standard card form. The unit used for controlling the operation of the card is advantageously a microcontroller (MCU) comprising e.g. a processor, a memory (RAM, ROM), and I/O lines for connecting the microcontroller with the other electronics of the card. Further, an external memory can be connected to the microcontroller.

The transmitter comprises e.g. a modulator for modulating the signal to be transmitted, filters particularly for attenuating spurious emissions, a mixer where the modulated signal is mixed with the local oscillator frequency for generating a radio-frequency signal, and a power amplifier for amplifying the signal to be transmitted. The amplified signal is transmitted to an antenna which is coupled to the card e.g. via a cable. The receiver comprises e.g. filters for filtering received signals, a mixer for converting the received radio-frequency signal to an intermediate frequency or, in a direct conversion type receiver, to a baseband frequency; and a detector for demodulating the received signal.

This kind of an expansion card can be advantageously used e.g. for the transmission of data between data processors via a mobile communication network, such as a GSM mobile communication network. Consequently, the expansion card is used as a modem for the data processor. It is thus advantageous to control such an expansion card by using above-mentioned standardised AT commands. This improves compatibility between different data communication application programs and modems and reduces dependency on certain modem solutions. On the other hand, there is an increasing need for such wireless communication, and it is thus advantageous to implement this wireless communication device so that it can be easily entered into a data communication connection with the data processor.

Below in this specification, the term expansion card refers particularly to such cards that can be used as modems, but the present invention is not limited solely to such modem applications.

However, modem applications and expansion cards of this kind can be provided with, in addition to said standardised AT function mode, one or several other function modes in which the expansion card can be controlled in a different way than with said AT commands. In this case, however, it is advantageous that the expansion card, in connection with turning on, is set in this AT function mode, wherein the function mode can be changed by means of a mode switching command or the like defined for this purpose.

When these kinds of expansion cards are connected with an electronic device, situations may occur when the expansion card is, for some reason or another, unexpectedly reset to its initial state. If such an unexpected turning on takes place in a situation when the expansion card is in another mode than the AT function mode, the expansion card, when turned on, may not necessarily be capable of understanding control commands transmitted by the data communication application interface. Thus, the whole data communication application interface may be stopped and data transmission interrupted. In some situations, it may even be possible that the expansion card connected to the data processor is unexpectedly reset to its initial state, possibly causing also a functional failure (jam) in the data processor, even though the expansion card is not used at the time. As a result, maybe the whole data processor must be turned on again, which is time consuming, and important information may be lost in this situation, if there was not time to save them. Such an abnormal situation may be caused e.g. by a bug in the data communication application software, in the interface, device driver, or in the application software of the expansion card itself. Other possible causes are high voltage peaks in the current supply system, static electric discharges and similar abnormal situations.

It is an aim of the present invention to provide an expansion card where the situation of turning on the expansion card can be controlled also during the use of the data processor. Further, after turning on the expansion card of the invention, the function mode of the expansion card can be returned to the function mode in which it was before turning on during the use. The expansion card according to the present invention is characterised in what will be presented in the characterising part of the appended claim 1. The method according to the invention is characterised in what will be presented in the characterising part of the appended claim 5. Further, the mobile station according to the present invention is characterised in what will be presented in the characterising part of the appended claim 10. The invention is based on the idea that information about turning on is transmitted from the expansion card to the electronic device controlling the expansion card, where the operation of the expansion card is controlled on the basis of this turning-on information and, if necessary, the function mode is changed to the function mode that was on before the reset.

The present invention gives significant advantages. The expansion card according to the invention can be reset without the user even noticing it. Turning on the expansion card of the invention will not require resetting the data processor or even resetting the data communication application program, but the operation can be continued normally even after turning on during use.

Figure 2:
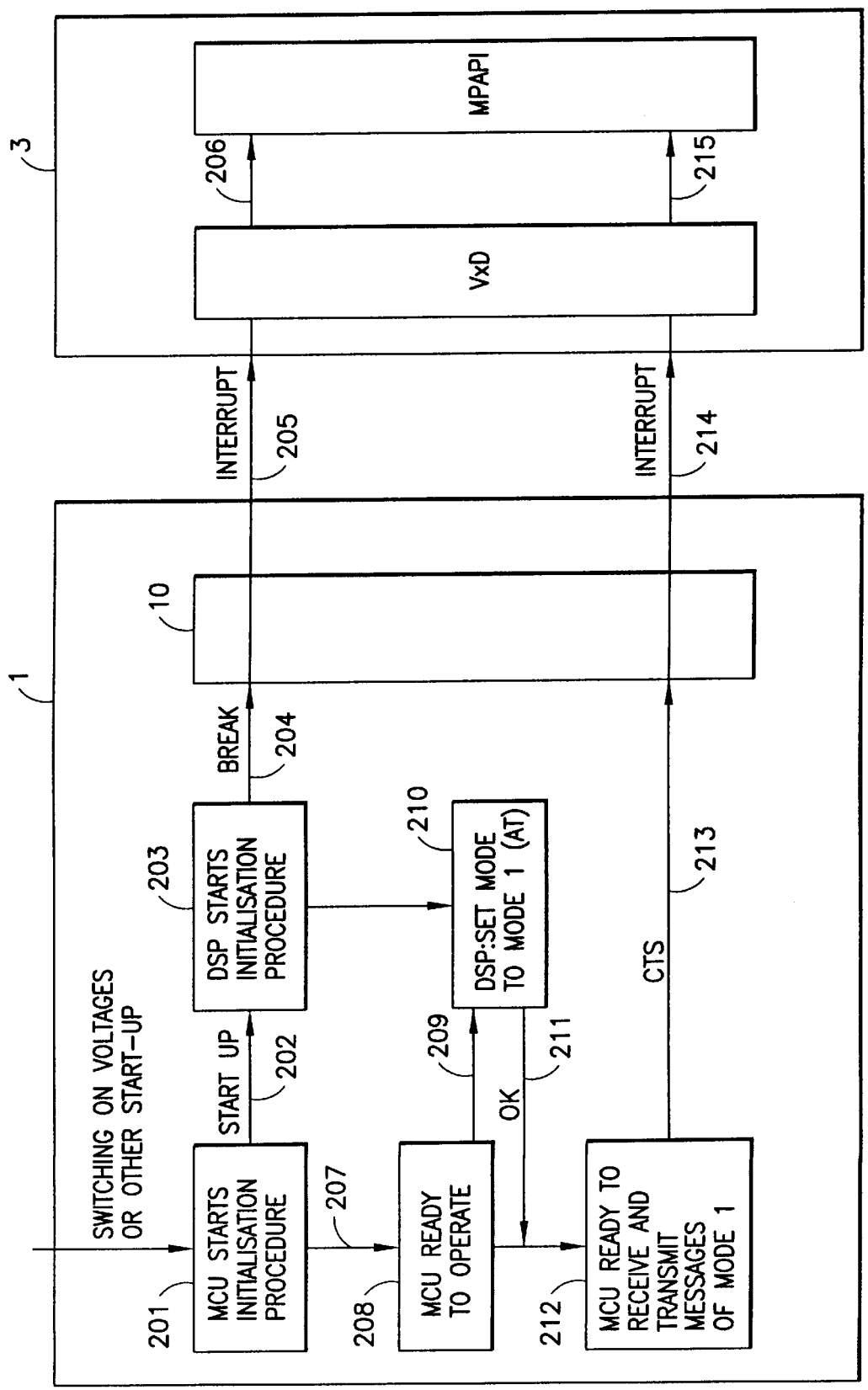
Figure 3:
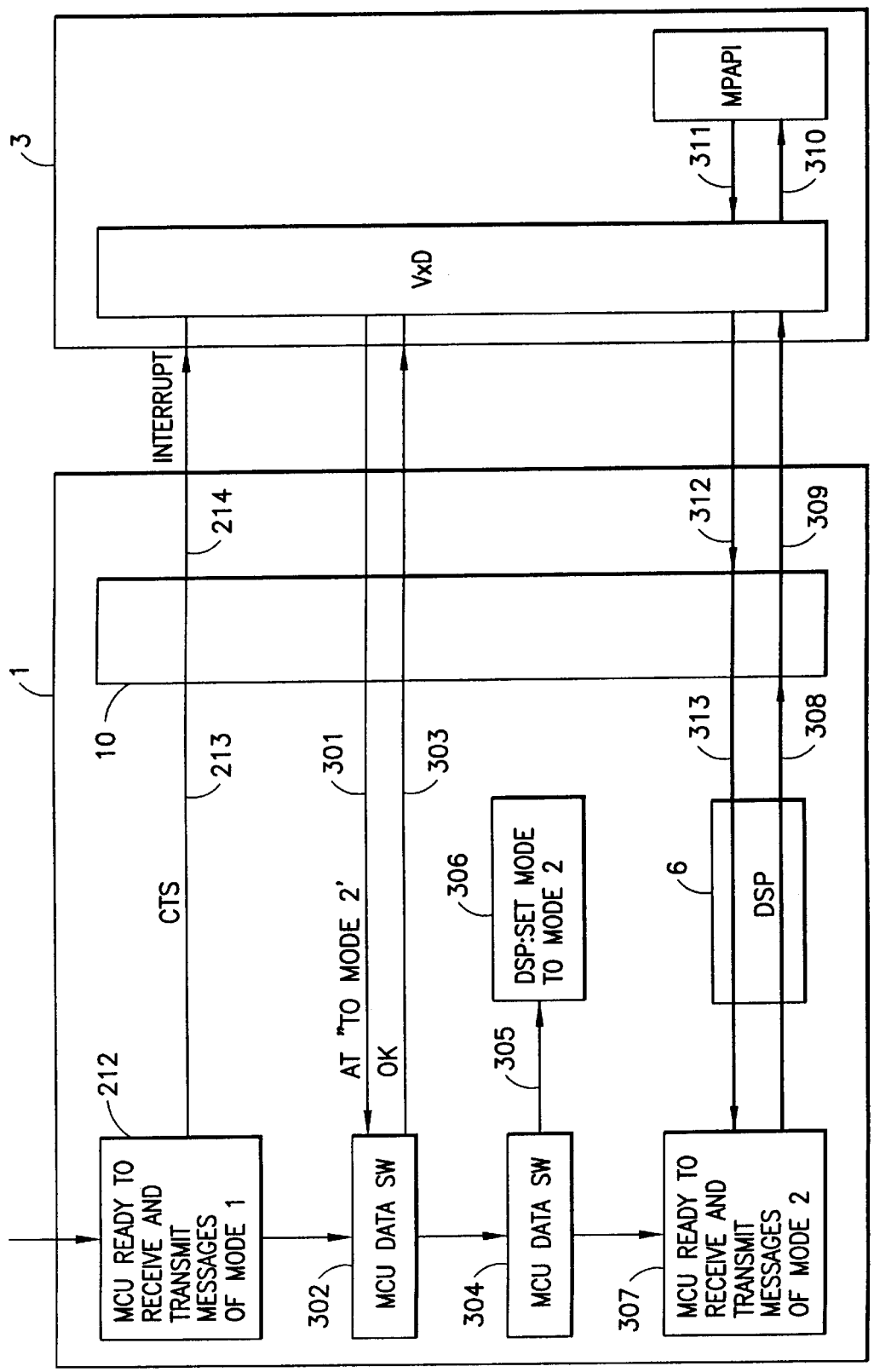
Figure 4:
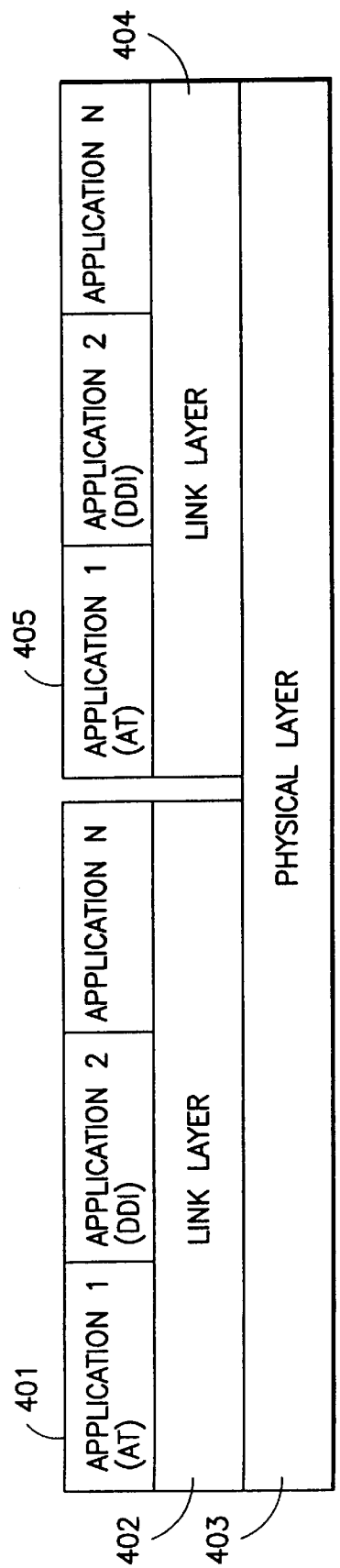

In the following, the invention will be described in more detail with reference to the appended drawings, in which FIG. 1 shows an expansion card according to an advantageous embodiment of the invention in a reduced block diagram, FIG. 2 is a reduced signalling chart showing the procedure of turning on in the expansion card and in the electronic device, FIG. 3 illustrates a mode change in an expansion card according to an advantageous embodiment of the invention in a reduced signalling chart, and FIG. 4 shows the transmission of information by using messages according to two different function modes.

FIG. 1 shows an expansion card 1 according to an advantageous embodiment of the invention in a reduced block chart. The expansion card 1 comprises an expansion card connector 2b, by means of which the expansion card 1 can be connected to an electronic device 3, such as a portable data processor. The electronic device 3 comprises a corresponding expansion card connector 2a, such as a connector according to the PCMCIA standard. Thus, the expansion card connector 2a of the electronic device comprises advantageously a male connector (not shown), to which the expansion card 1 is connected by means of the expansion card connector 2b of the expansion card, comprising advantageously a female connector (not shown). In the following, this expansion card connector 2a of the electronic device and the expansion card connector 2b of the expansion card are referred to by the joint term "expansion card connector" and indicated by the reference numeral 2. This expansion card connector 2 can be also another connector than one complying with the PCMCIA standard. The expansion card connector 2 comprises advantageously an address bus, a control bus and a data bus. The address bus consists typically of several address lines, by means of which the electronic device 3 is capable of referring to different functional parts of the expansion card 1. In a corresponding manner, the control bus can be used for transmitting control information, e.g. interrupt requests and state changes, from the expansion card 1 to the electronic device 3. Control information can also be transmitted from the electronic device 3 to the expansion card 1. Also for the transmission of data, several data lines, e.g. eight data lines, are reserved in a data bus of typically parallel form, wherein one byte of 8 bits can be transmitted at a time between the expansion card 1 and the electronic device 3. In the expansion card 2, not all connection lines are shown but only those that are helpful for illustrating the present invention.

In the expansion card 1, primarily those blocks are shown that are necessary for understanding the operation of the expansion card 1 and the invention. For controlling the operation of the expansion card 1, a controller 4 is used, advantageously a microcontroller MCU (micro control unit). The controller 4 is provided with a memory 5, such as a read only memory (ROM) for storing application software and the like, a random access memory (RAM) e.g. for storing information during the use. At least part of the memory 5 is advantageously a non-volatile random access memory (NVRAM). Also the application software can be stored in such a non-volatile random access memory, wherein it is easier to change application program versions. Also a so-called FLASH memory is known, which is a kind of non-volatile random access memory.

The controller 4 of the expansion card transmits information to a digital signal processing unit 6 (DSP), by means of which it is possible to carry out different signal processing operations, such as filtering. The data transmission between the controller 4 of the expansion card and the digital signal processing unit 6 is conducted advantageously via a control and data block 7 (API). This control and data block 7 is implemented advantageously with a dual port memory circuit (dual port RAM), known as such. Thus, there are separate address, control and data lines from the controller 4 to the control and data block 7 and, in a corresponding manner, there are separate address, control and data lines connected from the digital signal processing unit 6 to the control and data block 7. When data is written by the controller 4 to the control and data block 7, the control and data block 7 transmits information on this to the digital signal processing unit 6, which, on the basis of this information, reads the written information. The corresponding procedure is carried out in the reverse direction, when data is written by the digital signal processing unit 6 in the control and data block 7, and information on this writing is transmitted to the controller 4 which reads the written information.

In this advantageous embodiment, the digital signal processing unit 6 comprises also an asynchronous series connection block 8 (ASIO) and a synchronous series connection block 9 (SIO). By means of these, it is possible to transmit information in serial form between the digital signal processing unit 6 and a peripheral circuit, in this embodiment a bus adapter 10. This will be described below in this specification.

The bus adapter 10 of the expansion card is implemented advantageously with an application-specific logic circuit (application specific integrated circuit, ASIC). This bus adapter 10 is connected by two serial buses 11, 12 to the digital signal processing unit 6, for the transmission of information. In this advantageous embodiment, the first serial bus 11 is a so-called fast asynchronous serial bus (ASIO) which is connected to the asynchronous series connection block 8 of the digital signal processing unit 6. The second serial bus 12 is a so-called synchronous serial bus (PCMBUS) which is connected to the synchronous series connection block 9 of the digital signal processing unit 6. The bus adapter 10 comprises an asynchronous transmitter/receiver block 13 (universal asynchronous receiver transmitter, UART) for the first serial bus 11 and a synchronous transmitter/receiver block 14 (universal synchronous receiver transmitter, USRT) for the second serial bus 12. These transmitter/receiver blocks 13, 14 conduct the serial/parallel conversions of the information to be transmitted between the expansion card connector 2 and the serial bus 11, 12. These serial/parallel conversions are necessary when the expansion card 1 operates in the first function mode which in this advantageous embodiment corresponds to the function mode according to the PCMCIA standard. Thus, information is transmitted via the expansion card connector 2 in parallel form.

The expansion card comprises still a transmitter/receiver unit 15 which is for example a transceiver complying with the GSM standard and is used e.g. for signal modulation/demodulation and channel coding/decoding, as known.

The supervision circuit 27 (RESET) of the expansion card maintains the controller 4 of the card in the initial state when the operating voltage of the card is, for some reason, too low. Thus, malfunctions of the controller 4 are prevented e.g. when the operating voltages are switched on.

A clock circuit 28 in the expansion card generates timing signals needed in the operation of the expansion card 1.

The electronic device 3 according to FIG. 1 comprises e.g. a controller 16 which can be for example a microprocessor or a microcontroller. Further, the electronic device 3 is provided with a memory 17, such as a read only memory, a random access memory, and possibly also with a writeable mass memory. Part of the logic functions required for the operation of the electronic device are implemented advantageously with an application-specific logic circuit 18 which is arranged in a data transmission connection e.g. with the controller 16 of the electronic device. A connection bus 19 is conducted from the controller 16 and from the application-specific logic circuit 18 to the expansion card connector 22. This connection bus 19 comprises e.g. an address bus, a control bus and a data bus. The expansion card connector 2a of the electronic device is usually provided also with bus buffering means 20 for implementing the connection of the connection bus 19 and the expansion card connector 20 so that possible external disturbances do not easily damage the components of the electronic device 3. In the block diagram of FIG. 1, these bus buffering means 20 are shown in only one block for each bus (address, control and data bus), but its more detailed implementation will be obvious to an expert in the field.

The electronic device 3 of FIG. 1 is further equipped with a keypad 21, by means of which the user can control the operation of the electronic device 3. The electronic device 3 can generate various information for the user to be displayed on a display device 22. Moreover, the electronic device 3 can comprise a loudspeaker 23 and an earpiece 24 which are connected by an audio block 25 to the controller 16. The loudspeaker 23 and the microphone 24 can be used e.g. in connection with a voice call, wherein a loudspeaker and a microphone or a separate audio connection are not necessarily required in the expansion card 1.

A clock circuit 29 in the electronic device generates timing signals required for the operation of the electronic device 3. The operating voltage Vcc is formed e.g. by means of a battery 30, a regulation block 31 and a buffering block 32. The buffering block is used for levelling out possible load variations and it can be used also for forming several voltages, such as the actual operating voltage Vcc and a programming voltage. The battery is recharged advantageously with a charging device 33.

Next, the operation of the expansion card 1 according to FIG. 1 will be described in connection with turning on, with reference to the signalling chart of FIG. 2. The different stages of turning on are, for the essential parts, similar irrespective of whether the turning on takes place when the expansion card is inserted in the expansion card connector 2a, in connection with turning on the operating voltage, or after an unexpected resetting during operation of the expansion card 1. When the expansion card 1 is connected with the expansion card connector 2a of the electronic device 3 and the operating voltage is coupled to the expansion card 1, or when an unexpected resetting has occurred on the expansion card 1, the controller 4 of the expansion card 1 starts to conduct the initialising procedure. This is shown in block 201 of FIG. 2. The controller 4 transmits information on the setting to the digital signal processing unit 6. This is indicated by arrow 202 in FIG. 2. At this point, the digital signal processing unit 6 starts also to conduct its own start-up procedure (block 203). The signal processing unit 6 generates also an expansion card start-up signal BREAK to be transmitted to the bus adapter 10 (arrow 204). The start-up signal is transmitted advantageously via the first serial bus 11 to the bus adapter 10, where the asynchronous transmitter/receiver block 13 conducts serial/parallel conversion of the signal. A bus adapter control block 26 generates an interrupt request to the electronic device 3 as a sign that there is a new signal to be read in the asynchronous transmitter/receiver block 13. This interrupt message is for example a change in the state of a separate interrupt line (0→1 or 1→0). Let us assume that there is a data communication application interface MPAPI, such as a telephone application, on in the electronic device 3. In connection with this data communication application interface MPAPI, also a so-called virtual device controller VxD has been loaded, for transmitting information from the hardware level to the data communication application interface MPAPI and vice versa. In this case, after detecting an interrupt request, the controller 16 of the electronic device will move on to run this virtual device controller VxD. The virtual device controller VxD comprises a program code e.g. for controlling the expansion card connector 2, writing information on the data bus, reading information from the data bus, and transmitting information to an application, such as the data communication application interface.

The virtual device controller VxD reads the signal coming from the asynchronous transmitter/receiver block 13 and interprets the same. Because it is a signal informing on resetting, the virtual device controller VxD transmits information on this also to the data communication application interface MPAPI (arrow 206). Simultaneously, the virtual device controller VxD starts a first timer T1 which is e.g. an application program or a time counter implemented in a counter circuit of the controller 4 and comprising a defined counting time. This counting time can be implemented to be downwards counting so that timer is given an initial value corresponding to the counting time, and after the timer has been started, the timer reduces this counting time preferably at regular intervals. When the counting time is reduced to zero, the timer generates an interrupt request to the controller 4 or sets a time overflow flag or the like, which the controller can examine to find out if the counting time has expired. The timer can also be implemented as upwards counting, whereby the counting is started from zero and stopped when the counting time has expired. The purpose of this first timer T1 will be described below in this specification.

The controller 4 of the expansion card continues to run its initialising procedure (arrow 207). After the controller 4 has run the whole initialising procedure (block 208), the controller 4 transmits a command to set the first function mode (e.g. AT function mode) as the function mode to the digital signal processing unit 6 (arrow 209). The digital signal processing unit 6 sets its parameters so that the function mode is the first function mode. This is shown by block 210 in FIG. 2. After setting the function mode, the digital signal processing mode 6 transmits an acknowledgement message to the controller 4 of the expansion card (arrow 211), wherein the controller 4 knows that the function mode has been set. After this, the controller 4 is prepared to receive and transmit commands complying with the first function mode, i.e. AT commands (block 212). This information is transmitted also to the electronic device 3 advantageously so that the controller 4 of the expansion card generates a "clear to send" message CTS by a change in the state (0/1) of the CTS line of the asynchronous serial connection block 8 of the digital signal processing unit (arrow 213). This CTS line is not shown separately in the appended drawings, but it is implemented advantageously in the first serial bus 11 in a manner known as such. This change in the state of the CTS line is detected by the control block 26 of the bus adapter which generates an interrupt message to the electronic device 3 by means of the expansion card connector 2 (arrow 214). The controller 16 of the electronic device detects the interrupt message and moves further on to run the virtual device controller VxD, wherein the virtual device controller VxD knows that the expansion card 1 is ready to operate and can receive AT commands. The virtual device controller VxD transmits information about the change of the function mode of the expansion card 1 also to the data communication application interface MPAPI (arrow 215).

Because the expansion card 1 is turned on in the first function mode, it is possible to connect the expansion card 1 to several electronic devices, because most electronic devices 3 function in at least this first function mode. If the electronic device 3 supports also function according to the second function mode, the electronic device 3 can thus direct the expansion card 1 to this function mode.

The exchange of the function mode to another function mode can be carried out advantageously in the following manner. The virtual device controller generates an AT command whereby the function mode of the expansion card 1 is exchanged to the second function mode. This AT command is transmitted (arrow 301) via the expansion card connector 2 to the asynchronous transmitter/receiver block 13 for a parallel/serial conversion, and the command is transmitted on the first serial bus 11 to the digital signal processing unit 6, its asynchronous serial connection block 8. The digital signal processing unit 6 transmits the received AT command to the controller 4 of the expansion card, where this command is examined (block 304) and the procedure required by it is carried out. Thus, in this case, the function mode is exchanged to the second function mode. This is implemented e.g. in a way that the controller 4 generates a command to the digital signal processing unit 6 (arrow 305) whereby the digital signal processing unit 6 exchanges the function mode to the second function mode (block 306).

The controller 4 of the expansion card generates an acknowledgement message whereby the virtual device controller VxD is informed that the function mode has now been exchanged to the second function mode. This is indicated by arrow 303 in FIG. 3. The transmission of this message takes place by the same principle as described above in this specification, i.e. the message is transmitted from the controller 4 to the digital signal processing unit 6 where the asynchronous serial connection block 8 transmits the message in serial form via the first serial bus 11 to the asynchronous transmitter/receiver block 13 of the bus adapter 10 for serial/parallel conversion and for transmission to the electronic device 3 via the expansion card connector 2. For informing about the new incoming message in the expansion card connector 2, it is possible to use the interrupt principle, as described above in connection with starting up the expansion card 1.

Consequently, the controller 4 of the expansion card is now ready to receive and transmit commands complying with the second function mode (block 307). The arrows 308, 309 and 310 indicate the transmission of messages complying with the second function mode from the controller 4 of the expansion card via the digital signal processing unit 6, the first serial bus 11 and the expansion card connector 2 to the electronic device 3 where the virtual device controller reads the incoming messages from the expansion card connector 2 and transmits the information content of the messages to the data communication application interface MPAPI for processing. In a corresponding manner, arrows 311, 312 and 313 in FIG. 3 indicate the route of messages complying with the second function mode from the data communication application interface MPAPI via the virtual device controller VxD, the expansion card connector 2, the first serial bus 11 and the digital signal processing unit 6 to the controller 4 of the expansion card where the content of the messages is processed and the corresponding procedure is carried out, for example information is transmitted via telecommunication network, such as a mobile communication network, to another data processor (not shown).

The exchange to the second function mode is carried out e.g. in a case where there is an unexpected reset situation in the expansion card 1 when the expansion card 1 has been in another function mode. Information about this function mode is advantageously stored in the device controller VxD, and after detecting that an unexpected resetting has occurred, the device controller VxD carries out the exchange of the function mode of the expansion card 1 in the above-described manner, after resetting of the expansion card 1.

The above-described first timer T1 is intended e.g. for checking that the expansion card 1 operates in an appropriate way. If there is time for the first timer T1 to be set to zero before an acknowledgement is received from the expansion card 1 that the expansion card has been reset normally, the virtual device controller induces resetting of the expansion card 1 again for example via a reset line. Now, the first timer T1 is set advantageously a greater value and new resetting information is waited from the expansion card. If no interrupt signal informing about resetting is received from the expansion card 1 before the first timer T1 is set to zero, the virtual device controller transmits information to the data communication application interface MPAPI that there is probably a failure in the expansion card 1. On this, the data communication application interface MPAPI generates a message to the user, advantageously to the display device 22 of the electronic device.

A corresponding time check is carried out with a second timer T2 at the stage after an acknowledgement message is received from the expansion card about the setting of the expansion card 1 to the first function mode and the virtual device controller has sent a function mode exchange command to the expansion card 1. If no acknowledgement message to the function mode exchange command is received from the expansion card 1 before the second timer T2 is set to zero, the second timer T2 is set advantageously a greater value and an acknowledgement message is still waited for. If still no acknowledgement message is received before the second timer T2 is set to zero, it is still possible to try with a greater time value. After for example three attempts, no retrials are made but the user is informed about the fact that it is not possible to exchange the function mode with the expansion card used at the time.

The following is an example describing how the electronic device 3 and the expansion card 1 can communicate via the expansion card connector 2. The expansion card 1 is set to operate e.g. as a connection card (I/O). For example the PCMCIA standard contains a more detailed description on the requirements of different card types (I/O card and memory card) with expansion cards according to the PCMCIA standard, for example in view of the register structure and connection pins. In this context, it is said briefly that certain memory areas and connection areas can be addressed by the controllers 4, 16. The size of the memory area is typically considerably larger (even several megabytes) than the size of the whole connection area (a few hundred bytes or kilobytes). Separate control lines (such as read and write lines RD, WR) are arranged for processing the memory area, and in a corresponding manner, separate control lines (such as read and write lines IORD, IOWR) are arranged for processing the connection area. The area that is intended for processing at a time, is addressed by address lines of an address bus, e.g. 32 address lines for addressing the memory area and some of which (8/16) are used for addressing the connection area. It is more closely defined by the control lines which area is to be processed and, on the other hand, whether the controller is to read or write data. A data bus is used for reading and writing data.

The asynchronous transmitter/receiver block 13 and the synchronous transmitter/receiver block 14 are defined in different physical addresses in the connection area. In memory cards, the address area used is preferably the memory area. The address area contains e.g. 256 bytes, whereby eight address lines (A0 . . . A7) are required for addressing them. The controller 16 of the electronic device sets the desired device address in the address bus of the connection bus 19. After this, the state of the read line (IORD) in the address bus is set into a state in which information is transferred from the expansion card 1 to the data bus of the expansion card connector 2. Typically a reverse logic is used, i.e. when the read line (IORD) is in the logical 1 state, no data is written on the data bus, and, respectively, writing is allowed in the logical 0 state. Writing via the expansion card connector 2 to the expansion card 1 takes place advantageously in a manner that the controller 16 sets the data to be written in the data bus of the connection bus 19 and sets in the address bus the address corresponding to the transmitter/receiver block 13, 14 where the data is intended to be written, and after this the state of the write line (IOWR) in the control bus of the connection bus 19 is set in the logical value corresponding to the state allowing writing, e.g. the logical 0 state. Thus, the data that was in the data bus of the expansion card connector is transferred by the expansion card 1 into a buffer (not shown), from which the data can be transformed into serial form and transmitted to the serial bus 11, 12 according to whether it was written in the asynchronous transmitter/receiver block 13 or the synchronous transmitter/receiver block 14.

With an arrangement according to the first embodiment of the invention shown in FIG. 1, it is possible also in the second function mode to transmit messages according to the first function mode between the electronic device 3 and the expansion card 1. This example is illustrated also in the appended FIG. 4. The figure shows the route of information in a sandwich-type structure based on the open data transmission standard OSI (open system interconnection) by the International Standardisation Organisation ISO, disclosing seven different layers. An application layer (layer 7), a link layer (layer 2) and a physical layer (layer 1) are used here. A data communication application interface 401 generates messages (AT commands) complying with the first function mode which are transmitted e.g. to a virtual device controller 402 where the messages are converted into messages complying with the second function mode and transmitted via the expansion card connector 2 to the expansion card 1 (block 403). In the expansion card 1, the messages are transmitted in the asynchronous serial bus 11 to the asynchronous serial connection block 8 of the digital signal processing unit. The digital signal processing unit 6 transmits the messages to the controller 4 for processing. Advantageously in the processing software 404 of the asynchronous bus connector of the controller 4, the received messages of the second function mode are interpreted and converted into messages of the first function mode, which are further transmitted e.g. to the application software 405 of the controller 4 where these commands of the first function mode are interpreted. One advantage with this solution is that the data communication application interface MPAPI of the electronic device does not need to comprehend other messages than those complying with the first function mode. In the reverse direction, data is transmitted in a corresponding manner.

It is obvious that the signal informing about the resetting of the expansion card and the message informing about the setting of the function mode can be implemented also in one message, on the basis of which the electronic device 3 conducts a procedure similar to that described above.

The present invention is not limited solely to the embodiments presented above but it can be modified within the scope of the appended claims.

What is claimed is:

1. An expansion card arranged to be connected to an expansion card connector of an electronic device, which card is arranged to operate in at least a first function mode and which comprises at least:
  means for setting the function mode;
  means for connecting the expansion card to the expansion card connector of the electronic device,
  means for generating a signal upon the turning on of the expansion card;

means for transmitting the signal to an electronic device;

means for forming a message about setting the first function mode; and means for transmitting the message to the electronic device;

and wherein said expansion card further comprises:

means for receiving stored information about the function mode of the expansion card, said information being stored in the electronic device and transmitted to the expansion card in connection with a restart of the expansion card; and means for returning the function mode of the expansion card in accordance with said information about the function mode of the expansion card.

2. The expansion card according to claim 1, comprising at least two function modes, and further comprising means for receiving a function mode setting message from the electronic device.

3. The expansion card according to claim 1, further comprising a transmitter/receiver unit of a mobile station.

4. The expansion card according to claim 1, wherein the signal on turning on the expansion card is arranged to be generated at least in a situation of unexpected resetting of the expansion card.

5. A method for detecting the turning on of an expansion card connected to the expansion card connector of an electronic device and for setting a function mode, whereby the expansion card can be set in at least one of a first function mode and a second function mode, wherein in connection with the turning on of the expansion card, the following steps are taken in the expansion card:

a signal is generated and transmitted to the electronic device about the turning on of the expansion card, the expansion card is set in the first function mode, and a message is generated and transmitted to the electronic device about the setting of the first function mode, and wherein the turning-on signal and the function mode setting message are received in the electronic device and the following steps are taken in the electronic device:

selecting the function mode to be set on the expansion card;

generating a function mode exchange message; and transmitting the function mode exchange message to the expansion card;

conducting the exchange of the function mode to the selected function in the expansion card;

storing information about the function mode of the expansion card in the electronic device;

forming in the electronic device, in connection with the restart of the expansion card, a message comprising information in accordance with the stored information about the function mode of the expansion card; and transmitting said message to the expansion card and setting the function mode of the expansion card to the mode indicated in said message.

6. The method according to claim 5, wherein the same message is used as the turning-on signal and the function mode setting message.

7. The method according to claim 5, wherein the expansion card comprises further the transmitter/receiver unit of a mobile station.

8. The method according to claim 5, wherein the signal on turning on of the expansion card is generated at least in a situation of unexpected resetting of the expansion card.

9. The method according to claim 5, wherein the commands complying with the first function mode can be transmitted between the expansion card and the electronic device by means of messages complying with the second function mode, wherein:

at the transmission stage, the messages complying with the first function mode are converted to messages complying with the second function mode, and at the receiving stage, the messages complying with the first function mode are converted from the messages complying with the second function mode.

10. A mobile station which is arranged to operate in at least a first function mode and which comprises at least:

expansion card means arranged to be connected to an expansion card connector of an electronic device;

means for setting the function mode;

means for connecting the expansion card means to the expansion card connector of the electronic device, means for generating a signal upon the turning on of the expansion card means;

means for transmitting the signal to the electronic device;

means for forming a message about setting the first function mode; and means for transmitting the message to the electronic device;

and further comprising:

means for receiving stored information about the function mode of the expansion card from said electronic device, which information is in connection with the restart of the expansion card; and means for returning the function mode of the expansion card in accordance with said information about the function mode of the expansion card.

* * * * *